(12) United States Patent
Juergensmeyer et al.

(10) Patent No.: US 8,011,486 B2
(45) Date of Patent: Sep. 6, 2011

(54) ELECTROMAGNETICALLY ACTUABLE CLUTCH AND WATER PUMP HAVING AN ELECTROMAGNETICALLY ACTUABLE CLUTCH

(75) Inventors: Jan Juergensmeyer, Friedrichshafen (DE); Rainer Krafft, Heiligenberg (DE); Sigmund Geiger, Markdorf (DE)

(73) Assignee: Licos Trucktec GmbH, Markdorf (DE)

( * ) Notice: Subject to any disclaimer, the term of this patent is extended or adjusted under 35 U.S.C. 154(b) by 350 days.

(21) Appl. No.: 12/412,575

(22) Filed: Mar. 27, 2009

(65) Prior Publication Data

US 2009/0242350 A1    Oct. 1, 2009

(30) Foreign Application Priority Data

Mar. 28, 2008    (DE) .......................... 10 2008 016 277

(51) Int. Cl.
  *F16D 27/12*    (2006.01)
  *F01P 5/12*    (2006.01)

(52) U.S. Cl. ....... 192/48.2; 192/84.31; 192/90; 417/223

(58) Field of Classification Search ............... 192/84.31; 310/100

See application file for complete search history.

(56) References Cited

U.S. PATENT DOCUMENTS

| 6,915,887 B2 | 7/2005 | Faller et al. |
| 7,144,225 B2* | 12/2006 | Boffelli et al. ................. 417/223 |
| 2008/0210512 A1* | 9/2008 | Pescheck et al. .......... 192/84.31 |

FOREIGN PATENT DOCUMENTS

| DE | 32 03 143 A1 | 8/1983 |
| DE | 34 43 524 A1 | 6/1986 |
| DE | 101 58 732 A1 | 6/2003 |

* cited by examiner

*Primary Examiner* — Richard M. Lorence
(74) *Attorney, Agent, or Firm* — Burr & Brown

(57) ABSTRACT

An electromagnetically actuatable clutch for a water pump in a cooling water circuit of an internal combustion engine, having a drive wheel rotatably mounted relative to the water pump, and an armature disk, which interacts with a coil. The armature disk and a functional component of an eddy current clutch are connected to the drive wheel so that the drive wheel, armature disk and first functional component run synchronously when they rotate. The armature disk can be moved axially with the first functional component by energizing the coil. A second functional component of the eddy current clutch is provided arranged in a fixed fashion on a shaft coupled to the water pump. A friction mechanism is provided between the first and second functional components to provide a frictional locking engagement between the two functional components that is released by energizing the coil.

8 Claims, 1 Drawing Sheet

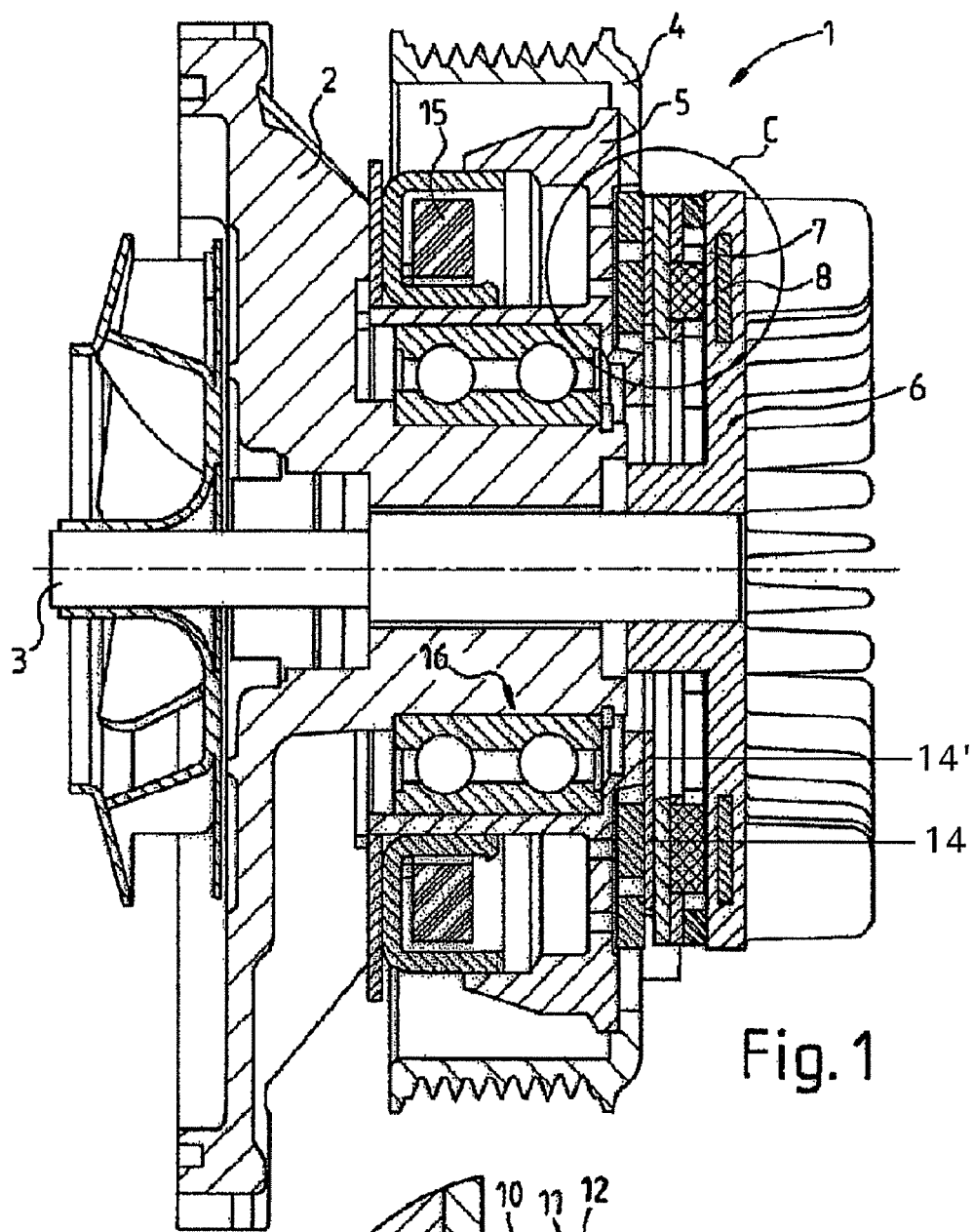
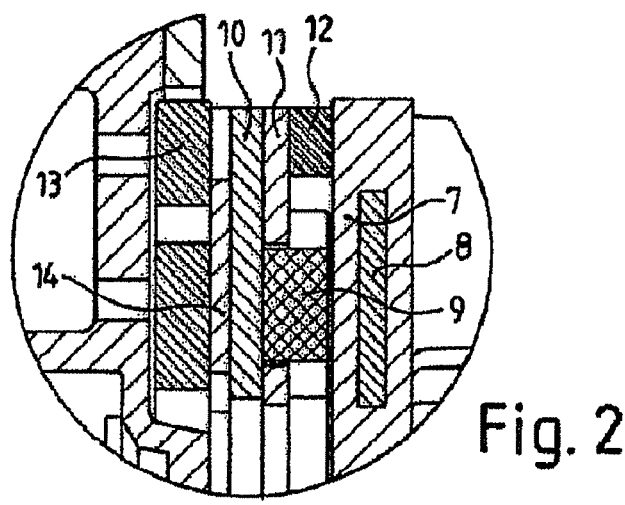
Fig. 1
Fig. 2

ELECTROMAGNETICALLY ACTUABLE CLUTCH AND WATER PUMP HAVING AN ELECTROMAGNETICALLY ACTUABLE CLUTCH

This application claims the benefit under 35 USC §119(a)-(d) of German Application No. 10 2008 016 277.9 filed Mar. 28, 2008, the entirety of which is incorporated herein by reference.

FIELD OF THE INVENTION

The invention relates to an electromagnetically actuatable clutch and to a water pump having an electromagnetically actuatable clutch.

BACKGROUND OF THE INVENTION

German Laid-Open Patent Publication No. 101 58 732 A1 discloses a drive element for a water pump in a cooling water circuit of an internal combustion engine having a drive wheel and a shaft which is coupled to the water pump. In order to transmit torque, an electromagnetically actuatable friction disk clutch and a second clutch device in the form of an eddy current clutch are provided between the drive wheel and the shaft. The eddy current clutch entrains the shaft if the friction clutch is disengaged. With a unit such as this it is possible to cope with the regularly occurring operating situation in a modern cooling system for internal combustion engines.

SUMMARY OF THE INVENTION

The invention is based on the object of making available a clutch with which, in particular, the driver of a cooling water pump in internal combustion engines can be made reliable.

The invention is based on an electromagnetically actuatable clutch for a water pump of the cooling water circuit of an internal combustion engine, which clutch has a drive wheel which can be rotatably mounted in the vicinity of the water pump or on the water pump. Furthermore, an armature disk is provided which interacts with a coil. The core of the invention is that the armature disk and a first functional component of an eddy current clutch are connected to the drive wheel in such a way that the drive wheel, the armature disk and the first functional component run synchronously when they rotate, wherein the armature disk can be moved axially with the functional component of the eddy current clutch by energizing the coil. The armature disk is preferably connected to the first functional component not only in a rotationally fixed fashion but also fixed in the axial direction. Furthermore, a second functional component of the eddy current clutch is provided which is designed to be arranged in a fixed fashion on a shaft which is coupled to the water pump, and in that a friction mechanism is provided between the first and second functional components of the eddy current clutch, wherein a frictional locking engagement can be formed between the two functional components by the friction mechanism as a function of the distance between the first functional component and the second functional component by axially displacing the first functional component.

The present invention provides a fail safe arrangement in which a drive can be provided to a water pump even when no current flows through the coil, for example in the event of a failure of the supply of electricity.

If the coil is energized, field lines, which pull the armature disk in the direction of the drive wheel, are produced. As a result, the axial distance between the first and second functional components of the eddy current clutch is preferably changed in such a way that the friction mechanism does not exert an effect between the first and second functional components but rather a relative movement between the first and second functional components occurs. Eddy currents are formed in one functional component as a result of a difference in rotational speed between the two functional components of the eddy current clutch, as a result of which the second functional component which is coupled to the water pump is driven at a slip rotational speed by means of the eddy current clutch. The slip rotational speed is lower than the drive rotational speed of the drive wheel. In this state, torque is therefore transmitted via the eddy current clutch without contact.

If the coil is not energized, for example if an electrical failure has taken place, magnetic forces between the first and second functional components of the eddy current clutch preferably cause the two functional components to exert an attraction force on one another, as a result of which the axially moveable first functional component is attracted toward the second functional component. As a result, the friction mechanism can enter into a frictional locking engagement, as a result of which, when there is maximum frictional locking engagement, the water pump is driven at the rotational speed of the drive wheel via the drive wheel and the first and second functional components, which are in frictional locking engagement, of the eddy current clutch. The drive of the water pump is therefore ensured even when there is a power failure.

The first functional component of the eddy current clutch preferably comprises a rotational element with permanent magnets, while, for example, the second functional component has a rotational element with an eddy current zone. This may be a region in front of a cast steel ring which causes the field profile to be improved. It is also conceivable for permanent magnets and eddy current zones to alternate on the first and second functional components or for the eddy current zone to be formed on the first functional component.

In a particularly preferred configuration of the invention, the eddy current zone is formed in the second functional component. On the second functional component, which is connected to a shaft and is coupled to the water pump, it is comparatively easy to provide a cooling element for cooling the eddy current zone.

In this case, permanent magnets are preferably arranged on the first functional component. In order to position the permanent magnets it is possible to use a spacer ring which preferably has cutouts for the permanent magnets. The permanent magnets may be held magnetically.

A friction lining may be used as the friction mechanism. The friction lining can be arranged on the first functional component and/or the second functional component of the eddy current clutch. For example, a friction lining ring can be attached to the second functional component.

BRIEF DESCRIPTION OF THE DRAWINGS

An exemplary embodiment of the invention is illustrated in the drawings and will be explained in more detail below together with the statement of their advantages and particularities.

FIG. 1 shows an electromagnetically actuatable clutch according to one embodiment of the invention in a sectional view on the drive shaft of a water pump, and a partially illustrated engine block; and FIG. 2 shows an enlarged illustration of the detail denoted by C in FIG. 1.

DETAILED DESCRIPTION OF THE INVENTION

FIGS. 1 and 2 depict a water pump clutch 1 arranged on a water pump housing 2 and on a drive shaft 3, emerging from the housing 2, of a water pump. The water pump clutch 1 comprises a belt pulley 4 which is continuously driven by, for example, an internal combustion engine via a v belt (not illustrated). The belt pulley 4 is rotatably mounted, for example, on the housing 2 by means of a bearing 16, independently of the housing 2 and the drive shaft 3, and is permanently connected to a rotor 5. The belt pulley 4 rotates, for example, at the rotational speed of the engine or a multiple thereof. A cooling ring 6 is permanently mounted on the drive shaft 3 of the water pump. The cooling ring 6 contains an eddy current zone 7 and a cast-in steel ring 8, for improved direction of the magnetic field.

Arranged and axially spaced opposite from the cooling ring 6 are permanent magnets 9 which are attached to a permanent magnet carrier 10 and held in their respective position by, for example, a metallic spacer ring 11.

Arranged opposite the spacer ring 11 is a friction lining 12, which is permanently connected to the cooling ring 6. The permanent magnet carrier 10 is coupled to an armature disk 13, in which case both elements 10 and 13 are connected to the rotor 5 in a rotationally fixed fashion.

The connection of the armature disk 13 and of the permanent magnet carrier 10 to the rotor 5 can be made, for example, by means of a spring 14 that is fixed to the rotor at 14' shown in FIG. 1. The spring 14 allows the permanent magnet carrier 10 and the armature disk 13 to move axially along the axis of the drive shaft 3. However, it is also conceivable for the coupling to the rotor 5 to be made by means of a guide unit, for example guide pins, which prevent a relative rotational movement but continue to permit axial movement.

The water pump clutch can be operated in two operating states.

If a coil 15 is energized, magnetic field lines are produced which attract the armature disk 13, with the result being that the armature disk 13 bears against the rotor 5. When the armature disk 13 is attracted to the rotor 5, the spacer ring 11 is simultaneously separated from the friction lining 12. As a result, a difference in rotational speed occurs between the permanent magnet carrier 10 and the cooling ring 6. This difference in rotational speed leads to eddy currents in the eddy current zone 7, with the result being that the cooling ring 6 is driven at a lower rotational speed than the permanent magnet carrier 10, referred to as a slip speed, due to the magnetic field which is formed as a result of this. Torque is therefore transmitted between the permanent magnet carrier 10 and the cooling ring 6 without contact, wherein the cooling ring 6 runs more slowly than the permanent magnet carrier 10. In order to attract the armature disk 13, it is possible to use a comparatively strong magnetic field for a short time, which magnetic field can be produced, for example, by means of a corresponding voltage pulse. As soon as the armature disk 13 bears against the rotor 5, the voltage of the coil 15 can be reduced as there is now an enlarged air gap between the permanent magnets 9 and the cast-in steel ring 8 and the acting magnetic field lines that attract the armature disk 13, connected to the permanent magnet carrier 10, in the direction of the cooling ring 6 are attenuated. Owing to the enlargement of the air gap, the expenditure of energy to maintain the position of the armature disk can be reduced.

If the coil 15 is switched off or not effective, for example because an electrical failure has taken place, the following situation occurs.

As a result of the loss of the magnetic field of the coil 15, the armature disk 13 is moved toward the cooling ring 6 since the field lines between the permanent magnets 9 and the steel ring 8 exert an attraction force on one another, to which attraction force there is no opposing force. The axial movement occurs until the spacer ring 11 is in axial contact with the friction lining 12. As a result of the frictional locking engagement between the friction lining 12 and the spacer ring 11, the cooling ring 6 is, in an ideal case, driven at the same rotational speed as the belt pulley 4 and the rotor 5. In this case, the water pump is directly activated. It is also conceivable for the frictional locking engagement to permit a certain degree of slip between the cooling ring 6 and the spacer ring 11.

It is also possible to provide an additional spring or some other element which can produce an elastic pressing-on force, in order to force the armature disk 13 and place it in frictional locking engagement when the coil 15 is not energized.

A state of friction of the locking engagement can occur, as already stated above, through intentional switching off of the coil 15 or through a fault in which the coil 15 is not energized as intended. However, in such a case reliable operation of the water pump clutch is always ensured since the water pump is driven via the frictional locking engagement.

LIST OF REFERENCE NUMERALS

1 Water pump clutch
2 Water pump housing
3 Drive shaft
4 Belt pulley
5 Rotor
6 Cooling ring
7 Eddy current zone
8 Steel ring
9 Permanent magnet
10 Permanent magnet carrier
11 Spacer ring
12 Friction lining
13 Armature disk
14 Spring
15 Coil
16 Ball bearing

What is claimed:

1. An electromagnetically actuatable clutch for a water pump for an internal combustion engine, comprising:
   a drive wheel rotatably mounted relative to the water pump;
   an armature disk connected to the drive wheel such that the armature disk is rotationally fixed to the drive wheel while being axially displaceable relative to the drive wheel;
   an eddy current clutch comprising
      a. a first functional component rotatably fixed to the armature and axially displaceable together with the armature disk;
      b. a second functional component fixed to a shaft coupled to the water pump; and
      c. a friction mechanism provided between the first and second functional components; and
   a coil for moving the armature disk and the first functional component axially away from the second functional component,
   wherein the friction mechanism provides a frictional locking engagement between the first and second functional components when the coil is unenergized.

2. A clutch according to claim 1, wherein one of the first and second functional components comprises a rotational element with permanent magnets.

3. A clutch according to claim 2, wherein the other one of the first and second functional components comprises a rotational element with an eddy current zone.

4. A clutch according to claim 3, wherein the eddy current zone is formed in the second functional component.

5. A clutch according to claim 1, further comprising a cooling element coupled to the second functional component.

6. A clutch according to claim 1, wherein the friction mechanism comprise a friction lining.

7. A clutch according to claim 1, further comprising permanent magnets arranged on the first functional component.

8. A water pump comprising the clutch according to claim 1.

* * * * *